United States Patent
Li et al.

(10) Patent No.: US 9,019,230 B2
(45) Date of Patent: Apr. 28, 2015

(54) CAPACITIVE TOUCHSCREEN SYSTEM WITH REDUCED POWER CONSUMPTION USING MODAL FOCUSED SCANNING

(75) Inventors: Sam Sen Li, Santa Cruz, CA (US);
Zachary Dietz, Lintang Pantai (MY);
Jeffrey Doar, Fremont, CA (US);
Jeffrey Stone, Fort Collins, CO (US)

(73) Assignee: PixArt Imaging Inc., Science-Based Industrial Park, Hsin-Chu (TW)

( * ) Notice: Subject to any disclaimer, the term of this patent is extended or adjusted under 35 U.S.C. 154(b) by 772 days.

(21) Appl. No.: 12/916,577

(22) Filed: Oct. 31, 2010

(65) Prior Publication Data

US 2012/0105357 A1 May 3, 2012

(51) Int. Cl.
*G06F 3/044* (2006.01)
*G06F 3/041* (2006.01)
*G06F 1/32* (2006.01)

(52) U.S. Cl.
CPC .............. *G06F 3/044* (2013.01); *G06F 1/3203* (2013.01); *G06F 1/3262* (2013.01); *G06F 3/0416* (2013.01)

(58) Field of Classification Search
CPC ..... G06F 3/044; G06F 3/0416; G06F 1/3203; G06F 1/3262
USPC ................. 345/173, 174; 178/18.06; 713/320
See application file for complete search history.

(56) References Cited

U.S. PATENT DOCUMENTS

| | | | |
|---|---|---|---|
| 5,923,320 A * | 7/1999 | Murakami et al. ............ 345/179 |
| 8,334,846 B2 * | 12/2012 | Westerman et al. .......... 345/173 |
| 2002/0035701 A1 | 3/2002 | Casebolt et al. | |
| 2008/0307240 A1 | 12/2008 | Dahan et al. | |
| 2009/0251433 A1 | 10/2009 | Park et al. | |
| 2010/0128985 A1 * | 5/2010 | El-Sana et al. ................ 382/189 |
| 2010/0156853 A1 * | 6/2010 | Narusawa ..................... 345/183 |
| 2011/0080349 A1 * | 4/2011 | Holbein et al. ............... 345/173 |
| 2012/0044151 A1 * | 2/2012 | Wilson et al. ................. 345/173 |

OTHER PUBLICATIONS http://www.eetasia.com/ART 8800471346 499491 NP 27ce87f6. HTM, "Mobile Handset Taps Capacitive-Touch Sensing", Mark Lee, Posted Jul. 9, 2007.
http://www.industrialcontroldesignline.com/howto/
223300088;jsessionid=
MZ2ALQNQ3SSCFQE1GHPSKH4ATMY32JVN>, "Not all Touch Screens are Created Equal", Steve Kolokowsky and Trevor Davis, Posted Mar. 8, 2010.

* cited by examiner

*Primary Examiner* — Ryan A Lubit
*Assistant Examiner* — Yaron Cohen
(74) *Attorney, Agent, or Firm* — Winston Hsu; Scott Margo (57) ABSTRACT

Disclosed herein are various embodiments of a capacitive touchscreen system that is capable of sensing finger touches made on a capacitive touchscreen according to various scanning modes that reduce power consumption of the capacitive touchscreen system. The disclosed power saving scanning modes are modally focused, and can be used not only to reduce system power consumption, but also to enhance the user experience with the capacitive touchscreen system.

5 Claims, 7 Drawing Sheets

• detected touch
◦ cells to be scanned

FIG. 9

○ - 1st 1/4 scan
△ - 2nd 1/4 scan
□ - 3rd 1/4 scan
● - 4th 1/4 scan

FIG. 10

CAPACITIVE TOUCHSCREEN SYSTEM WITH REDUCED POWER CONSUMPTION USING MODAL FOCUSED SCANNING

FIELD OF THE INVENTION

Various embodiments of the invention described herein relate to the field of capacitive sensing input devices generally, and more specifically to means and methods for reducing power consumption of such devices during operation.

BACKGROUND

Two principal capacitive sensing and measurement technologies are currently employed in most touchpad and touchscreen devices. The first such technology is that of self-capacitance. Many devices manufactured by SYNAPTICS™ employ self-capacitance measurement techniques, as do integrated circuit (IC) devices such as the CYPRESS PSOC.™ Self-capacitance involves measuring the self-capacitance of a series of electrode pads using techniques such as those described in U.S. Pat. No. 5,543,588 to Bisset et al. entitled "Touch Pad Driven Handheld Computing Device" dated Aug. 6, 1996.

Self-capacitance may be measured through the detection of the amount of charge accumulated on an object held at a given voltage (Q=CV). Self-capacitance is typically measured by applying a known voltage to an electrode, and then using a circuit to measure how much charge flows to that same electrode. When external objects are brought close to the electrode, additional charge is attracted to the electrode. As a result, the self-capacitance of the electrode increases. Many touch sensors are configured such that the grounded object is a finger. The human body is essentially a capacitor to a surface where the electric field vanishes, and typically has a capacitance of around 100 pF.

Electrodes in self-capacitance touchpads are typically arranged in rows and columns. By scanning first rows and then columns the locations of individual disturbances induced by the presence of a finger, for example, can be determined. To effect accurate multi-touch measurements in a touchpad, however, it may be required that several finger touches be measured simultaneously. In such a case, row and column techniques for self-capacitance measurement can lead to inconclusive results.

One way in which the number of electrodes can be reduced in a self-capacitance system is by interleaving the electrodes in a saw-tooth pattern. Such interleaving creates a larger region where a finger is sensed by a limited number of adjacent electrodes allowing better interpolation, and therefore fewer electrodes. Such patterns can be particularly effective in one dimensional sensors, such as those employed in IPOD click-wheels. See, for example, U.S. Pat. No. 6,879,930 to Sinclair et al. entitled Capacitance touch slider dated Apr. 12, 2005.

The second primary capacitive sensing and measurement technology employed in touchpad and touchscreen devices is that of mutual capacitance, where measurements are performed using a crossed grid of electrodes. See, for example, U.S. Pat. No. 5,861,875 to Gerpheide entitled "Methods and Apparatus for Data Input" dated Jan. 19, 1999. Mutual capacitance technology is employed in touchpad devices manufactured by CIRQUE.™ In mutual capacitance measurement, capacitance is measured between two conductors, as opposed to a self-capacitance measurement in which the capacitance of a single conductor is measured, and which may be affected by other objects in proximity thereto.

In some mutual capacitance measurement systems, an array of sense electrodes is disposed on a first side of a substrate and an array of drive electrodes is disposed on a second side of the substrate that opposes the first side, a column or row of electrodes in the drive electrode array is driven to a particular voltage, the mutual capacitance to a single row (or column) of the sense electrode array is measured, and the capacitance at a single row-column intersection is determined. By scanning all the rows and columns a map of capacitance measurements may be created for all the nodes in the grid. When a user's finger or other electrically conductive object approaches a given grid point, some of the electric field lines emanating from or near the grid point are deflected, thereby decreasing the mutual capacitance of the two electrodes at the grid point. Because each measurement probes only a single grid intersection point, no measurement ambiguities arise with multiple touches as in the case of some self-capacitance systems. Moreover, it is possible to measure a grid of m×n intersections with only 2n pins on an IC.

It is well known that capacitive touchscreen systems, owing to their frequent use in battery-operated mobile electronic devices, present formidable challenges to reducing the power consumption thereof.

What is needed is a capacitive touchscreen system that features reduced power consumption.

SUMMARY

In one embodiment, there is provided a method of reducing power consumption in a capacitive touchscreen system comprising providing, under control of a touchscreen processor, drive signals to a first plurality of electrically conductive drive traces, a second plurality of electrically conductive sense traces being located in proximity to the first plurality of drive traces such that mutual capacitances are developed between the first and second pluralities of traces by the drive signals at locations where the first and second pluralities of traces intersect to form pixels, such mutual capacitances changing in the presence of one or more fingers, hands or touch devices brought into proximity thereto at touch locations on the touchscreen, sensing, under control of the touchscreen processor, mutual capacitances along each of the second plurality of sense traces during at least first and second frames, the second frame following the first frame, during the first frame, detecting and determining in the touchscreen processor a first touch location on the touchscreen associated with a first touch on the basis of sensed mutual capacitances, during the second frame, detecting and determining in the touchscreen processor a second touch location on the touchscreen associated with a second touch on the basis of sensed mutual capacitances, and determining in the touchscreen processor, on the basis of the first and second locations, a predicted third touch location on the touchscreen associated with a third touch that has not yet occurred.

In another embodiment, there is provided a capacitive touchscreen system featuring reduced power consumption comprising means for providing, under control of a touchscreen processor, drive signals to a first plurality of electrically conductive drive traces, a second plurality of electrically conductive sense traces located in proximity to the first plurality of drive traces such that mutual capacitances are developed between the first and second pluralities of traces by the drive signals provided thereto at locations where the first and second pluralities of traces intersect to form pixels, such mutual capacitances changing in the presence of one or more fingers, hands or touch devices brought into proximity thereto at touch locations on the touchscreen, means for sensing, under control of the touchscreen processor, mutual capacitances along each of the second plurality of sense traces during at least first and second frames, the second frame following the first frame, wherein the touchscreen processor is configured to detect and determine in during the first frame a first touch location on the touchscreen associated with a first touch on the basis of sensed mutual capacitances, to detect and determine during the second frame a second touch location on the touchscreen associated with a second touch on the basis of sensed mutual capacitances, and to determine a predicted third touch location on the touchscreen associated with a third touch that has not yet occurred on the basis of the first and second locations.

In yet another embodiment, there is provided a method of reducing power consumption in a capacitive touchscreen system comprising providing, under control of a touchscreen processor, drive signals to a first plurality of electrically conductive drive traces, a second plurality of electrically conductive sense traces being located in proximity to the first plurality of drive traces such that mutual capacitances are developed between the first and second pluralities of traces by the drive signals at locations where the first and second pluralities of traces intersect to form pixels, such mutual capacitances changing in the presence of one or more fingers, hands or touch devices brought into proximity thereto at touch locations on the touchscreen, sensing at a first fractional scan rate in a full scan mode over a first predetermined period of time corresponding to a no touch timer, and under control of the touchscreen processor, mutual capacitances along the second plurality of sense traces, if touches are detected on the touchscreen within the first predetermined period of time, resetting the no touch timer to zero and continuing to sense at the first full scan rate in the full scan mode mutual capacitances along the second plurality of sense traces, if no touches are detected on the touchscreen within the first predetermined period of time, sensing at a second reduced scan rate in a first rest mode over a second predetermined period of time corresponding to a first rest timer, if touches are detected on the touchscreen within the second predetermined period of time, resetting the no touch timer to zero and resuming sensing at the first full scan rate in the full scan mode the mutual capacitances along the second plurality of sense traces, if no touches are detected on the touchscreen within the second predetermined period of time, sensing at a third reduced scan rate in a second rest mode over a third predetermined period of time corresponding to a second rest timer, the third reduced scan rate being lower than the second reduced scan rate, if touches are detected on the touchscreen within the third predetermined period of time, resetting the no touch timer to zero and resuming sensing at the first full scan rate in the full scan mode the mutual capacitances along the second plurality of sense traces, if no touches are detected on the touchscreen within the third predetermined period of time, entering a locked mode in which a reduced number of the second plurality of traces are sensed.

Further embodiments are disclosed herein or will become apparent to those skilled in the art after having read and understood the specification and drawings hereof.

BRIEF DESCRIPTION OF THE DRAWINGS

Different aspects of the various embodiments of the invention will become apparent from the following specification, drawings and claims in which:

The drawings are not necessarily to scale. Like numbers refer to like parts or steps throughout the drawings.

DETAILED DESCRIPTIONS OF SOME EMBODIMENTS

Figure 1:
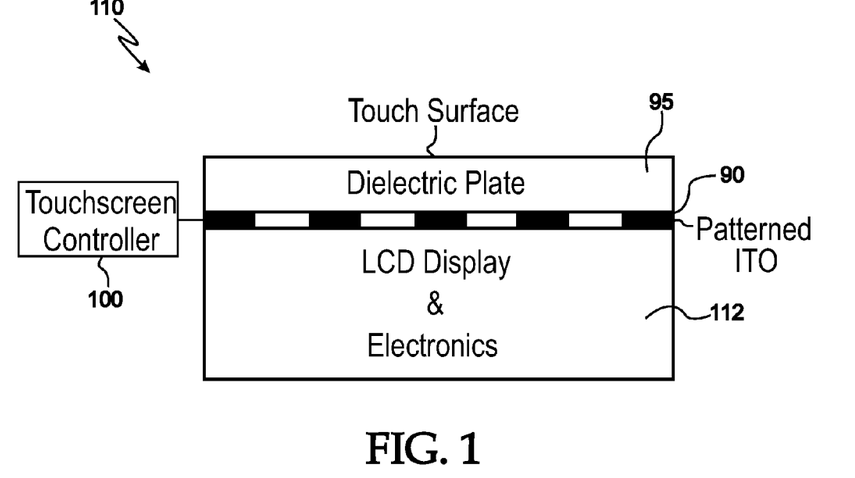
FIG. 1 shows a cross-sectional view of one embodiment of a capacitive touchscreen system.

As illustrated in FIG. 1, a capacitive touchscreen system 110 typically consists of an underlying LCD or OLED display 112, an overlying touch-sensitive panel or touchscreen 90, a protective cover or dielectric plate 95 disposed over the touchscreen 90, and a touchscreen controller, micro-processor, application specific integrated circuit ("ASIC") or CPU 100. Note that image displays other than LCDs or OLEDs may be disposed beneath display 112. The navigation hardware controller portion of touchscreen controller or CPU 100 carries out navigation control and helps effect power consumption reduction, more about which is said below.

Figure 2:
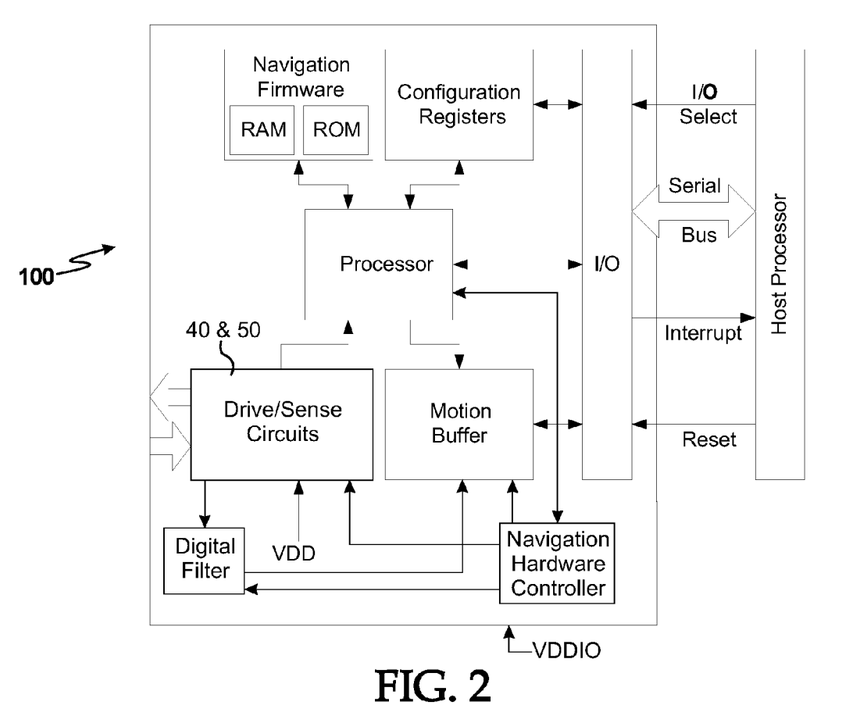
FIG. 2 shows a block diagram of one embodiment of a capacitive touchscreen controller.

FIG. 2 shows a block diagram of one embodiment of a touchscreen controller 100. In one embodiment, touchscreen controller 100 may be an Avago Technologies™ AMRI-5000 ASIC or chip 100 modified in accordance with the teachings presented herein. In one embodiment, touchscreen controller 100 is a low-power capacitive touch-panel controller designed to provide a touchscreen system with high-accuracy, on-screen navigation.

Figure 3:
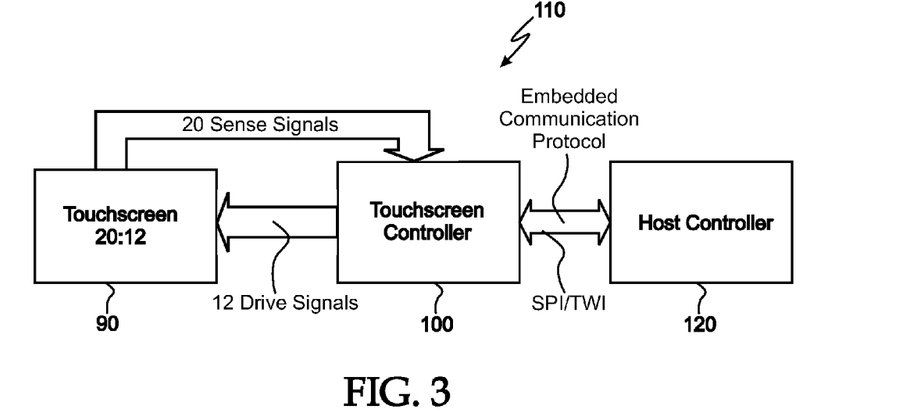
FIG. 3 shows one embodiment of a block diagram of a capacitive touchscreen system and a host controller.
Figure 4:
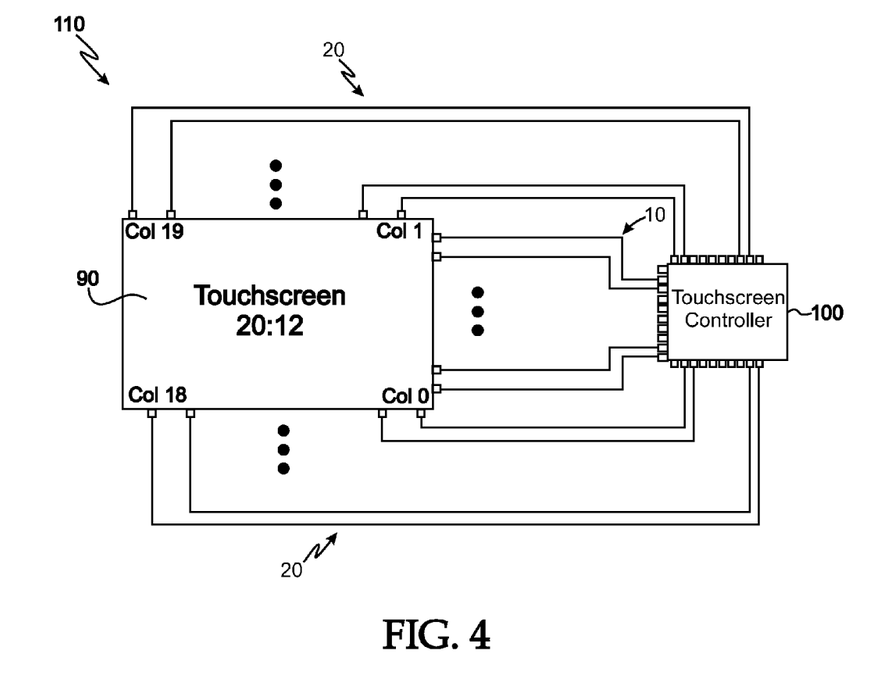
FIG. 4 shows a schematic block diagram of one embodiment of a capacitive touchscreen system.

Capacitive touchscreens or touch panels 90 shown in FIGS. 3 and 4 can be formed by applying a conductive material such as Indium Tin Oxide (ITO) to the surface(s) of a dielectric plate, which typically comprises glass, plastic or another suitable electrically insulative and preferably optically transmissive material, and which is usually configured in the shape of an electrode grid. The capacitance of the grid holds an electrical charge, and touching the panel with a finger presents a circuit path to the user's body, which causes a change in the capacitance.

Touchscreen controller 100 senses and analyzes the coordinates of these changes in capacitance. When touchscreen 90 is affixed to a display with a graphical user interface, on-screen navigation is possible by tracking the touch coordinates. Often it is necessary to detect multiple touches. The size of the grid is driven by the desired resolution of the touches. Typically there is an additional cover plate 95 to protect the top ITO layer of touchscreen 90 to form a complete touch screen solution (see, e.g., FIG. 1).

One way to create a touchscreen 90 is to apply an ITO grid on one side only of a dielectric plate or substrate. When the touchscreen 90 is mated with a display there is no need for an additional protective cover. This has the benefit of creating a thinner display system with improved transmissivity (>90%), enabling brighter and lighter handheld devices. Applications for touchscreen controller 100 include, but are not limited to, smart phones, portable media players, mobile internet devices (MIDs), and GPS devices.

Referring now to FIGS. 3 and 4, in one embodiment the touchscreen controller 100 includes an analog front end with 12 drive signal lines and 20 sense lines connected to an ITO grid on a touchscreen. Touchscreen controller 100 applies an excitation such as a square wave, meander signal or other suitable type of drive signal to the drive electrodes that may have a frequency selected, by way of example, from a range between about 40 kHz and about 200 kHz. The AC signal is coupled to the sense lines via mutual capacitance. Touchscreen 90 with a finger disposed thereon or in proximity thereto alters the capacitance at the location of the touch. Touchscreen controller 100 can resolve and track multiple touches simultaneously. A high refresh rate allows the host to track rapid touches and any additional movements without appreciable delay. The embedded processor filters the data, identifies the touch coordinates and reports them to the host. The embedded firmware can be updated via patch loading. Other numbers of drive and sense lines are of course contemplated, such as 9×16 and 8×12 arrays.

Touchscreen controller 100 and the navigation hardware controller thereof feature multiple operating modes with varying levels of power consumption. In rest mode controller 100 periodically looks for touches at a rate programmed by the rest rate registers. There are multiple rest modes, each with successively lower power consumption. In the absence of a touch for a certain interval controller 100 automatically shifts to the next-lowest power consumption mode. However, as power consumption is reduced the response time to touches may increase.

According to one embodiment, and as shown in FIGS. 1, 3 and 4, an ITO grid on the touchscreen 90 comprises sense rows 20 and drive columns 10, where the sense rows are operably connected to sense circuits 40 of FIG. 2 and the drive columns 10 are operably connected to drive circuits 50 of FIG. 2. One configuration for routing ITO drive and sense lines to touchscreen controller 100 is shown in FIG. 4.

Note that the rows in a touchscreen may be configured to operate as sense lines, and the columns in a touchscreen may be configured to operate as drive lines. Drive lines may also be selectably switched to operate as sense lines, and sense lines may be selectably switched to operate as drive lines under the control of appropriate multiplexing and control circuitry. Moreover, drive and sense lines may be configured in patterns other than rows and columns, or other than orthogonal rows and columns. Those skilled in the art will understand that touchscreen controllers, micro-processors, ASICs or CPUs other than a modified AMRI-5000 chip or touchscreen controller 100 may be employed in touchscreen system 110, and that different numbers of drive and sense lines, and different numbers and configurations of drive and sense electrodes, other than those explicitly shown herein may be employed without departing from the scope or spirit of the various embodiments of the invention.

In one embodiment, the angle between traces 10 and 20 is about 90 degrees (as shown, for example in FIG. 4), but may be any suitable angle such as, by way of example, about 15 degrees, about 30 degrees, about 45 degrees, about 60 degrees, or about 75 degrees. Electrically conductive traces 10 and 20 may be disposed in substantially parallel but vertically-offset first and second planes, respectively, or may be disposed in substantially the same plane. In one embodiment, electrically conductive traces 10 and 20 comprise indium tin oxide ("ITO"), or any other suitable electrically conductive material. A liquid crystal display may be disposed beneath electrically conductive traces 10 and 20, or any other suitable image display. Electrically conductive traces 10 and 20 are preferably disposed on a substrate comprising an electrically insulative material that is substantially optically transparent.

Note that touchscreen system 110 may be incorporated into or form a portion of an LCD, a computer display, a laptop computer, a personal data assistant (PDA), a mobile telephone, a radio, an MP3 player, a portable music player, a stationary device, a television, a stereo, an exercise machine, an industrial control, a control panel, an outdoor control device, a household appliance, or any other suitable electronic device.

In a capacitive touchscreen system an m-row by n-column touch grid is typically continuously sampled at all of m×n cells or pixels at the same sampling rate. As the number of touches at any given time is only a small percentage of the total number of cells, the power consumption and system performance can be significantly improved if only those cells or pixels relevant to touches on the touchscreen are sampled. This goal can be achieved by adaptively configuring the touchscreen controller 100 and its corresponding navigation hardware controller to operate in various modes in which individual groups of cells or pixels are selectively sampled at a variable sampling rate and/or frame rate.

Figure 5:
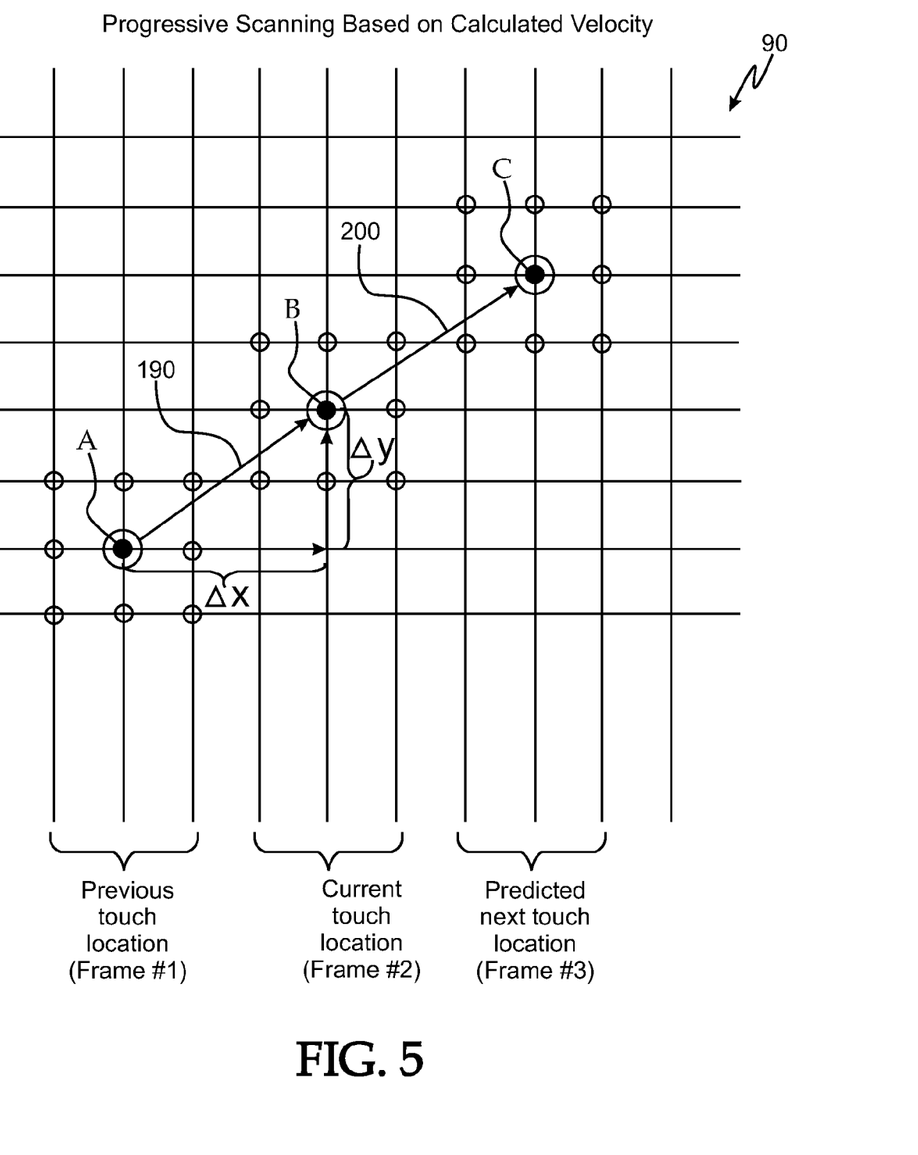
FIG. 5 shows detected and predicted touches on a touchscreen in accordance with one embodiment of a method.

In one embodiment of a method of reducing power consumption in a capacitive touchscreen system, and under control of touchscreen processor 100 and the navigation hardware controller, drive signals are provided to a first plurality of electrically conductive drive traces, where a second plurality of electrically conductive sense traces is located in proximity to the first plurality of drive traces such that mutual capacitances are developed between the first and second pluralities of traces by the drive signals at locations where the first and second pluralities of traces intersect to form cells or pixels. The mutual capacitances change in the presence of one or more fingers, hands or touch devices brought into proximity thereto at touch locations on touchscreen 90 Under control of the touchscreen processor, mutual capacitances are sensed along each of the second plurality of sense traces during at least first and second frames, where the second frame follows the first frame. During the first frame, a first touch location on touchscreen 90 associated with a first touch is detected and determined in touchscreen processor 90 on the basis of sensed mutual capacitances. This first touch is represented by touch location A on touchscreen 90 of FIG. 5. During the second frame, a second touch location B on touchscreen 90 associated with a second touch is detected and determined in touchscreen processor 100 on the basis of sensed mutual capacitances. On the basis of the first and second locations A and B, a predicted third touch location C on touchscreen 90 associated with a third touch is calculated by controller 100 and the navigation hardware controller. Velocity vector 190 may be calculated by touchscreen controller 100 and the navigation hardware controller between touch locations A and B to more accurately predict the third touch location C. Velocity vector 200 may also be calculated by touchscreen controller 100 and the navigation hardware controller between touch locations B and C to more accurately predict a fourth touch location (not shown in FIG. 5). Note that as used herein, the first, second and third frames may be separated by other intervening frames or scans.

When referring to first, second and third touches herein, and to avoid confusion, it is important to note the first, second and third touches can be made in different ways and therefore have different meanings. In one embodiment, the first, second and third touches mean first, second and third discrete and separate touches made by a user upon touchscreen 90, where the user's finger touches the touchscreen at the first location to make the first touch, the user's finger is then lifted off touchscreen 90 from the first location and moved above touchscreen 90 to the second location where the second touch on touchscreen 90 is then made by the user's finger, and the user's finger is subsequently lifted off touchscreen 90 from the second location and moved above touchscreen 90 to the third location where the third touch on touchscreen 90 is then made by the user's finger, and further where the first, second and third touches are detected during different frames. In another embodiment, the first, second and third touches mean a single continuous finger touch on touchscreen 90, where the user's finger moves between the first, second and third locations without the user's finger being lifted away from contact with touchscreen 90, and where the first, second and third touches are detected during different frames. In still another embodiment, the first, second and third touches mean a combination of discrete and continuous finger touches, where the user's finger moves, for example, between the first and second locations without lifting away from contact with touchscreen 90 but subsequently does lift away from contact with touchscreen 90 between the second and third locations, and where the first, second and third touches are detected during different frames.

Adjusting the frame rate for sensing in a neighborhood of cells or pixels of interest only when touches have been detected in such neighborhood can introduce tracking latency. Progressively turning up the frame or scan rate in the neighborhood of pixels or cells of interest indicated by detected touches can reduce or eliminate such tracking latency, and can be accomplished by calculating velocity vectors corresponding to a given touch or touches. Calculating velocity vectors allows more accurate prediction of where a future touch is likely to occur when the next or subsequent frame scan takes place. Accordingly, higher frame or scan rates can be programmed in touchscreen controller 100 and the navigation hardware controller for application in the neighborhood of cells or pixels surrounding the predicted future touch location, thereby eliminating tracking latency. Similarly, lower frame or scan rates, or no scanning, can be programmed in touchscreen controller 100 and the navigation hardware controller for application in the neighborhood of cells or pixels that do not surround the predicted future touch location and that are some predetermined distance on touchscreen 90 away from the future touch location, thereby reducing the power consumption of the capacitive touchscreen system.

Figure 6:
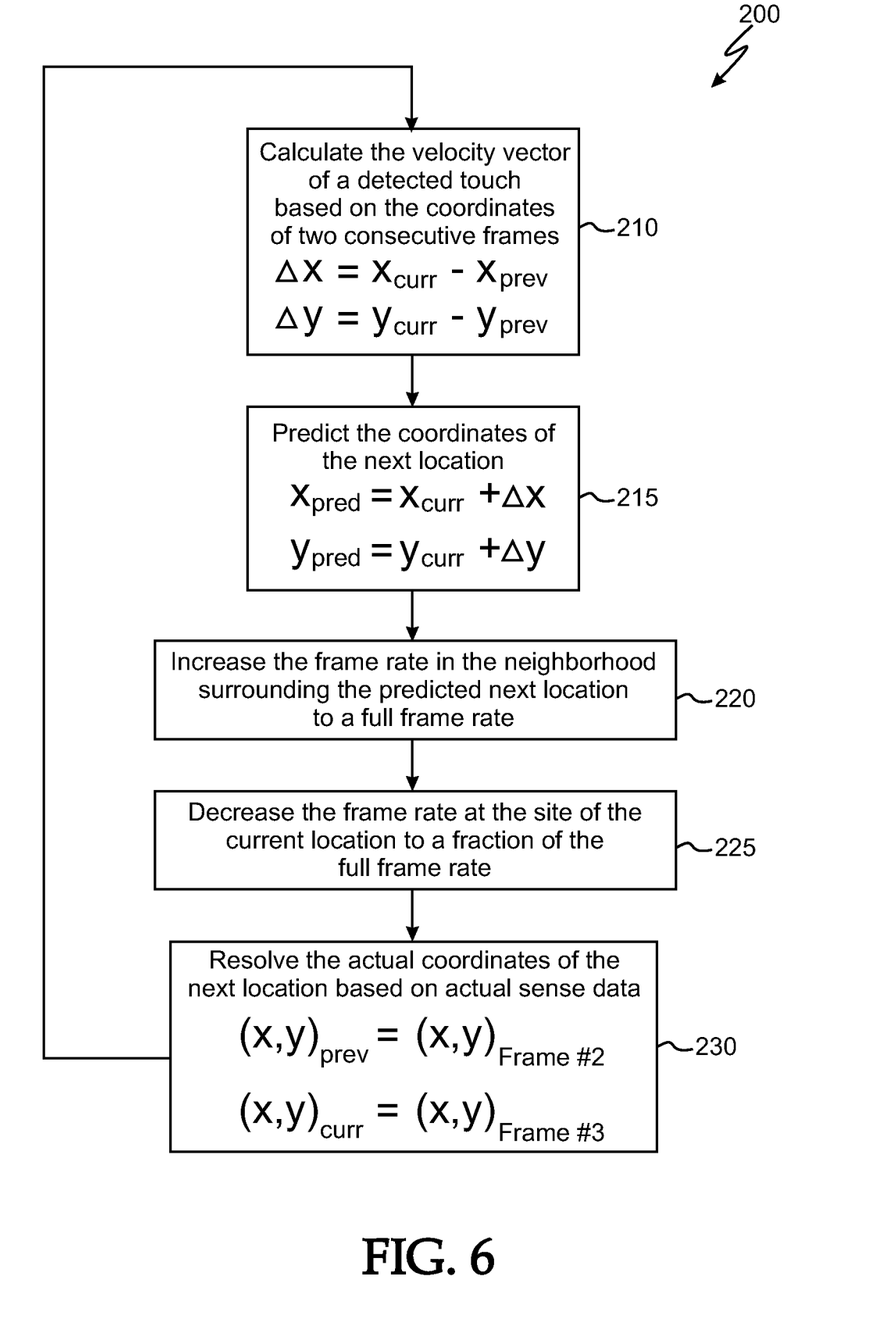
FIG. 6 shows a flow chart corresponding to the method of FIG. 5.

FIG. 6 shows one embodiment of a method 200 for carrying out some of the steps described above in connection with FIG. 5, which in one embodiment is employed to enhance the user experience while the system is operating in the RUN mode described below in connection with method 300 of FIG. 7. Referring now to both FIGS. 5 and 6, at step 210 a velocity vector of a detected touch based on the coordinates of touch locations for two consecutive frames is calculated by touchscreen controller 100. At step 215, the coordinates of the next future touch location are calculated by controller 100 on the basis of the previously calculated velocity vector. At step 220, the frame rate of cells or pixels in the neighborhood of and surrounding the future touch location is increased to a full frame rate. At step 225, the frame rate of cells or pixels that are not in the neighborhood of and that do not surround the future touch location is decreased to a fraction of the full frame rate. At step 230, the actual coordinates of the touch location corresponding to the predicted touch location are resolved after the user has actually touched touchscreen 90, presumably in the neighborhood of pixels or cells located in or near the predicted touch location.

Note that the pixels or cells in the vicinity or neighborhood of the predicted third touch location can form, by way of example, 3×3 or 5×5 pixel or arrays of cells. Arrays of other sizes may also be employed. In one embodiment, the full frame rate can range between about 60 frames per second and about 250 frames per second, and the reduced frame rate can range between about 5 frames per second and about 60 frames per second. Other full and reduced frame rates are also contemplated. Moreover, decimation ratios between a sample rate and a rate at which frames are acquired for touchscreen 90 can be reduced in those portions of touchscreen 90 where frame rates scanning is reduced, and correspondingly may be increased in those portions of touchscreen 90 where frame rates or scanning is increased. Frame rates can also be maintained at a current rate if the number of touches on the touchscreen is determined in the touchscreen processor to be neither substantially increasing nor substantially decreasing. To further decrease power consumption of the capacitive touchscreen system, frames corresponding to different portions of the touchscreen can be acquired sequentially. For example, the different portions of the touchscreen can correspond to one of one-eighth, one-fourth, one-third, one-half or any other fraction of the touchscreen, where such portions are scanned sequentially or according to some other predetermined scanning pattern.

Set forth below is one embodiment of an illustrative pseudo code computer program corresponding to the method 200 of FIG. 6. Note that all the pseudo code programs disclosed herein are preferably implemented in the navigation hardware controller module of touchscreen controller 100 of FIG. 2, although other means and methods of implementing such pseudo code are contemplated.

TABLE 1

Computer Pseudo Code Program for FIG. 6

```
while (1) {
   // calculate the velocity vector of a detected touch,
   // (x_prev,y_prev) stores the xy coordinates of the touch in Frame #1,
   // (x_curr,y_curr) stores the xy coordinates of the touch in Frame #2.
   delta_x = x_curr − x_prev;
   delta_y = y_curr − y_prev;
   // predict the coordinates of the touch in the next frame.
   x_pred = x_curr + delta_x;
   y_pred = y_curr + delta_y;
   // increase the frame rate in the neighborhood surrounding
   // the predicted next location of the touch.
   frame_rate(x_pred,y_pred) = 'FULL_FRAME_RATE; // 200fps
   for example
   // decrease the frame rate in the neighborhood surrounding
   // the current location of the touch
   frame_rate(x_curr,y_curr) = 'FRACTIONAL_FRAME_RATE; //
   60fps for example
   wait(new frame);
   // resolve the actual coordinates of the touch based on
   // actual sense data.
   (x_prev,y_prev) = (x,y)Frame #2;
   (x_curr,y_curr) = (x,y)Frame #3;
}
```

Figure 7:
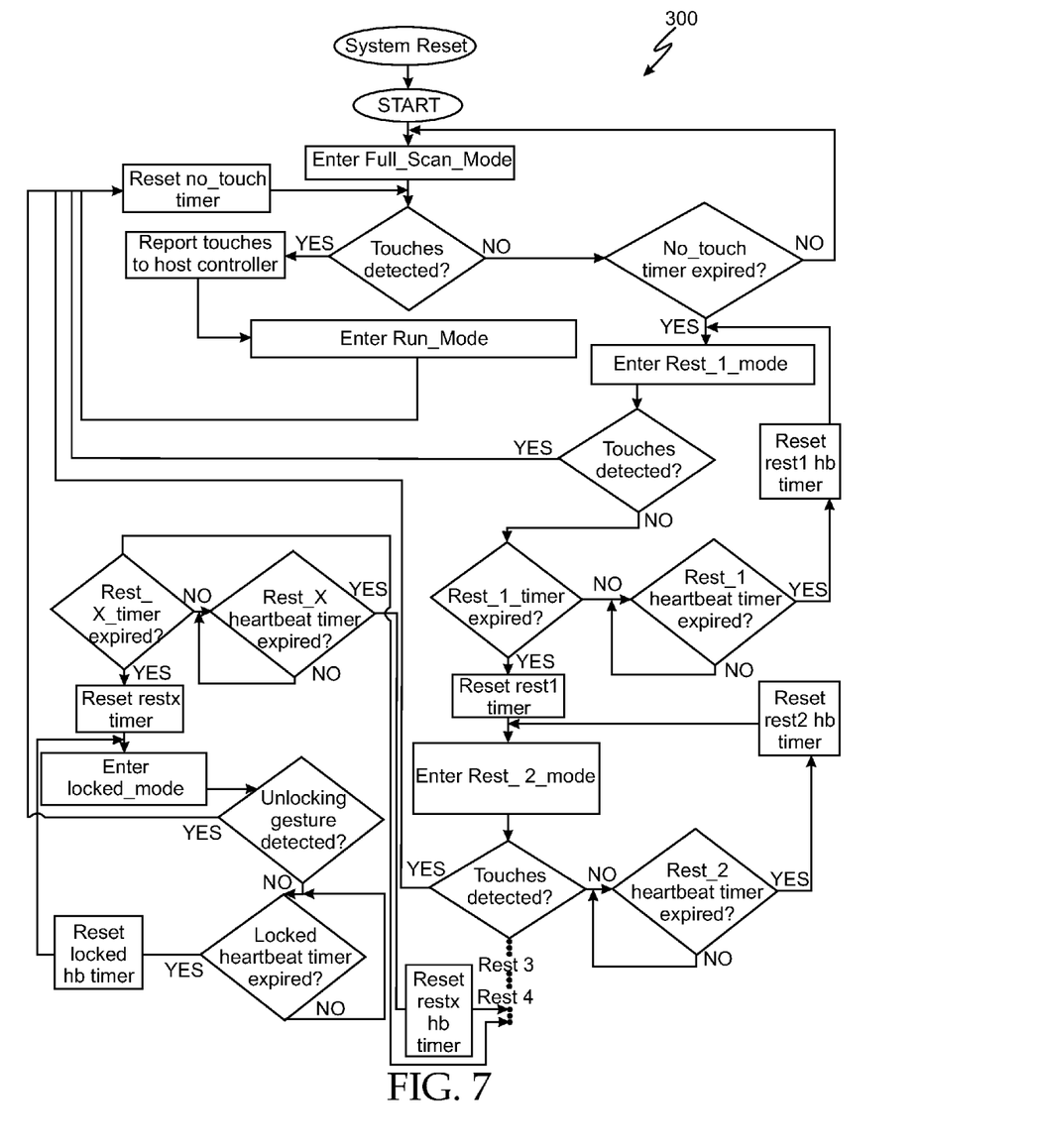
FIG. 7 is a flow chart illustrating one embodiment of a method for reducing power consumption in a capacitive touchscreen system.

Referring now to FIG. 7, there is shown another embodiment of a method 300 for reducing power consumption in a capacitive touchscreen system. The system starts up in Full Scan Mode by scanning the entire touchscreen 90 at a fractional frame rate. Note that the fractional frame or scan rate is less than the full or maximum frame or scan rate, which helps reduce power consumption. If touches are detected, the system enters into Run Mode; if no touches are detected for the duration of time defined by a No Touch Timer, the system enters into Rest 1 Mode. In Rest 1 Mode, and in one embodiment, a fraction such as ¼ of the total number of cells or pixels of touchscreen 90 is scanned per frame and at a frame rate that is reduced to a fraction of the maximum or full frame rate.

In one embodiment, the four quarters of touchscreen 90 are sequentially and cyclically scanned on a per frame basis. Consequently, a full scan of the entire touchscreen 90 only results after 4 such frames. Each selected cell, array of cells or neighborhood of cells that is scanned requires activating and energizing corresponding pairs of column drive and row sense channels. As such, not scanning all cells or pixels in touchscreen 90 during a given frame, in combination with much slower frames rate than those corresponding to the Run Mode achieves a balance between power consumption reduction and touch detection responsiveness.

As further shown in FIG. 7, a heartbeat timer paces scanning. At the end of each scan, if touches are detected, the system immediately transitions out of Rest 1 Mode into Full Scan Mode. With a separate timer, the system also keeps track of how long it has been in Rest 1 Mode. If the separate timer indicates that a programmable timing threshold has been exceeded, then the system enters into the next stage of rest, or Rest 2 Mode. In Rest 2 Mode, the system operates in similar fashion to Rest 1 Mode but at an even slower frame rate, and with a higher threshold for transitioning into the next stage of rest. As determined by current use mode requirements and practicality of implementation, there can be more stages of Rest Modes with one or more of progressively slower frame rates, higher thresholds for transitioning, smaller sample windows, and windows with coarser spatial sampling. At the last stage in a chain of Rest Modes, if the timer expires with no touches detected, the system enters into Locked Mode.

Continuing to refer to FIG. 7, in Locked Mode, an even smaller fraction of touchscreen 90 is scanned than in the various Rest Modes, and at a further reduced fraction of the full or maximum frame rate. The portion of touchscreen 90 that is to be scanned in Locked Mode is predetermined and programmable. For example, in the Locked Mode scanning can be limited to the rightmost or leftmost three columns of cells on touchscreen 90. Other configurations of cells that are to be scanned in the Locked Mode are also contemplated. A timer provides pacing for the Locked Mode of operation. To exit the Locked Mode, a user is required to apply a certain predefined gesture, touch pattern or sequence of touches, which may be limited to predetermined locations on touchscreen 90. Upon exiting the Locked Mode, the system enters into Full Scan Mode.

Continuing to refer to FIG. 7, while the touchscreen system is operating in RUN mode, only a small number of cells or pixels (such a 3×3 array, for example) neighboring or in the vicinity of the cell or cells where a touch is detected are scanned at the full or maximum frame rate, while the remaining cells are scanned at a reduced or fractional frame or rate of the full or maximum frame rate, such as at, by way of example, one-half the full scan rate. Other reduced scan rates are also contemplated. A newly detected touch in an area of touchscreen 90 that is being scanned at a reduced or lowered frame rate results in a switch to the full or maximum frame rate in the vicinity of such newly detected touch. Touchscreen controller 90 can also be programmed such that a moving touch arriving in a neighborhood of cells or pixels that is being scanned at a reduced frame rate results in a switch to the full or maximum frame rate in the vicinity of such neighborhood of cells. Touchscreen controller 90 can further be programmed such that a touch that is detected to be leaving a particular neighborhood of cells or pixels where a full or maximum scan rate is being employed results in a lower frame rate for such particular neighborhood of cells.

In addition, the method described above in connection with FIG. 7 may be modified or supplemented by detecting the number of simultaneous touches occurring on touchscreen 90 at any given time, and then adjusting the frame rate on the basis of the detected number of simultaneous touches. If the number of simultaneous touches on touchscreen 90 is high, the frame rate is increased. If the number of simultaneous touches on touchscreen 90 is low, the frame rate is decreased. If the number of simultaneous touches on touchscreen 90 remains the same as in one or more previous frames, the frame rate is maintained at its current level.

Set forth below is one embodiment of an illustrative pseudo code computer program corresponding to method 300 of FIG. 7. Note that all the pseudo code programs disclosed herein are preferably implemented in the navigation hardware controller module of touchscreen controller 100, although other means and methods of implementing such pseudo code are contemplated.

TABLE 2

Computer Pseudo Code Program for FIG. 7

```
parameter FULL_SCAN_MODE;
parameter RUN_MODE;
parameter REST_1_MODE;
parameter REST_2_MODE;
parameter REST_3_MODE;
parameter REST_4_MODE;
parameter REST_X_MODE;
parameter LOCKED_MODE;
while (1) {
  if (system_reset) {
    mode = FULL_SCAN_MODE;
    no_touch_timer = 0;
    rest_1_timer = 0;
    rest_1_hb_timer = 0;
    rest_2_timer = 0;
    rest_2_hb_timer = 0;
    rest_x_timer = 0;
    rest_x_hb_timer = 0;
    locked_timer = 0;
  }
  switch (mode) {
    FULL_SCAN_MODE: {
      // 'FRACTIONAL_FRAME_RATE = 60fps
      scan(all cells,'FRACTIONAL_FRAME_RATE);
      if (touches_detected) {
        no_touch_timer = 0;
        report_touches( );
        mode = RUN_MODE;
      }
      else {
        if (no_touch_timer == no_touch_terminal_count) {
          no_touch_timer = 0;
          mode = REST_1_MODE;
        }
        else {
          no_touch_timer ++;
          mode = FULL_SCAN_MODE;
        }
      }
    }
    RUN_MODE: {
      // "neighborhood": 3x3 array of cells containing a touch
      // 'FULL_FRAME_RATE = 200fps,
      'FRACTIONAL_FRAME_RATE = 60fps
```

TABLE 2-continued

Computer Pseudo Code Program for FIG. 7

```
        scan(neighborhoods(detected touches),'FULL_FRAME_RATE');
        scan(remaining cells, 'FRACTIONAL_FRAME_RATE');
        if (touches_detected) {
            no_touch_timer = 0;
            report_touches( );
            mode = RUN_MODE;
        }
        else {
            if (no_touch_timer == no_touch_terminal_count) {
                no_touch_timer = 0;
                mode = REST_1_MODE;
            }
            else {
                no_touch_timer ++;
                mode = FULL_SCAN_MODE;
            }
        }
    }
    REST_1_MODE: {
        if (rest_1_hb_timer == rest_1_hb_terminal_count) {
            rest_1_hb_timer = 0;
            // 4 'QUARTER_PANELS as defined in diagram
            scan
            (iterate('QUARTER_PANELS,'FRACTIONAL_FRAME_RATE));
            if (touches_detected) {
                rest_1_timer = 0;
                rest_1_hb_timer = 0;
                report_touches( );
                mode = RUN_MODE;
            }
            else {
                if (rest_1_timer == rest_1_terminal_count) {
                    rest_1_hb_timer = 0;
                    mode = REST_2_MODE;
                }
                else {
                    rest_1_hb_timer ++;
                    mode = REST_1_MODE;
                }
            }
        }
        else {
            rest_1_hb_timer ++;
            mode = REST_1_MODE;
        }
    }
    REST_2_MODE: {
        if (rest_2_hb_timer == rest_2_hb_terminal_count) {
            rest_2_hb_timer = 0;
            // 4 'QUARTER_PANELS as defined in diagram
            scan
            (iterate('QUARTER_PANELS,'FRACTIONAL_FRAME_RATE));
            if (touches_detected) {
                rest_2_timer = 0;
                rest_2_hb_timer = 0;
                report_touches( );
                mode = RUN_MODE;
            }
            else {
                if (rest_2_timer == rest_2_terminal_count) {
                    rest_2_hb_timer = 0;
                    mode = REST_3_MODE;
                }
                else {
                    rest_2_hb_timer ++;
                    mode = REST_2_MODE;
                }
            }
        }
        else {
            rest_2_hb_timer ++;
            mode = REST_2_MODE;
        }
    }
    REST_3_MODE: {
        ...
    }
    REST_4_MODE: {
        ...
    }
    .
    .
    .
    REST_X_MODE: {
        if (rest_x_hb_timer == rest_x_hb_terminal_count) {
            rest_x_hb_timer = 0;
            // 4 'QUARTER_PANELS as defined in diagram
            scan
            (iterate('QUARTER_PANELS,'FRACTIONAL_FRAME_RATE));
            if (touches_detected) {
                rest_x_timer = 0;
                rest_x_hb_timer = 0;
                report_touches( );
                mode = RUN_MODE;
            }
            else {
                if (rest_x_timer == rest_x_terminal_count) {
                    rest_x_hb_timer = 0;
                    mode = LOCKED_MODE;
                }
                else {
                    rest_x_hb_timer ++;
                    mode = REST_X_MODE;
                }
            }
        }
        else {
            rest_x_hb_timer ++;
            mode = REST_X_MODE;
        }
    }
    LOCKED_MODE: {
        if (locked_timer == locked_terminal_count) {
            locked_timer = 0;
            // 'FRACTIONAL_PANEL could be rightmost 3 columns, for
            example.
            scan('FRACTIONAL_PANEL,'FRACTIONAL_FRAME_RATE);
                if (touches_detected) {
                    report_touches( );
                    if (unlock_gesture_detected) {
                        mode = FULL_SCAN_MODE;
                    }
                    else {
                        mode = LOCKED_MODE;
                    }
                }
                else {
                    locked_timer ++;
                    mode = LOCKED_MODE;
                }
        }
    }
}
```

Figure 8:
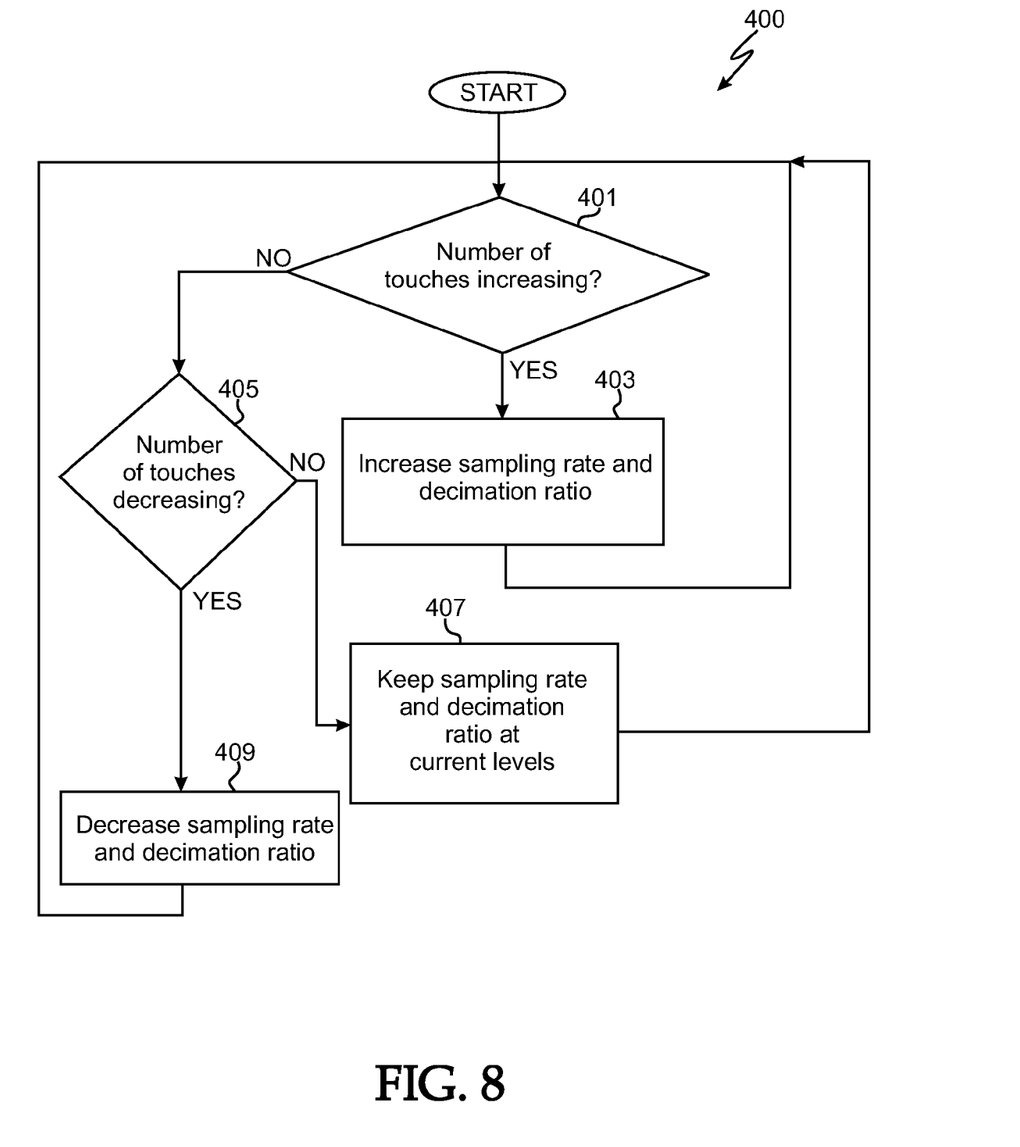
FIG. 8 is a flow chart illustrating another embodiment of a method for reducing power consumption in a capacitive touchscreen system.

Referring now to FIG. 8, there is shown another embodiment of method 400 for reducing power consumption in a capacitive touchscreen system, and which may also be employed to enhance the user experience while the system is operating in the RUN mode described above in connection with method 300 of FIG. 7. It is known that a capacitive touchscreen system's signal-to-noise-ratio (SNR) can directly affect the user experience, and is inversely related to the number of simultaneous touches being tracked. As the number of simultaneous touches on touchscreen 90 increases, the SNR must be increased if all the simultaneous touches are to be detected accurately. Method 400 of FIG. 8 increases the SNR of the capacitive touchscreen system, and permits multiple simultaneous touches on touchscreen 90 to be better differentiated from one another and to be more accurately detected.

Continuing to refer to FIG. 8, at step 401 touchscreen controller 100 determines whether the number of touches on touchscreen 90 is increasing. If the number of touches on touchscreen 90 is determined to be increasing, the sampling rate and decimation ratio are increased. By sampling rate, we mean the rate at which the A/D converter of touchscreen controller 100 is sampling acquired frames. The decimation ratio is the ratio of the sampling rate to the frame or scan rate. Note that the frame or scan rate can be different from the report rate, which is the rate at which detected touches (or no touches) are reported to host controller 120. (In one embodiment, the report rate is about 200 Hz, and the frame or scan rate ranges between about 5 Hz and about 200 Hz depending on the particular operating mode being employed at any given time.) If the number of touches on touchscreen 90 is determined to be decreasing, then the sampling rate and decimation ratio are decreased at step 409. Otherwise, that is if the number of touches on touchscreen 90 is determined by touchscreen controller 100 to be neither increasing substantially nor decreasing substantially, decimation ratios and sampling are maintained at their current levels. Method 400 of FIG. 8 permits the signal-to-noise ration (SNR) of the capacitive touchscreen system to adjust on the fly by varying the decimation ratio between the sampling rate and the frame rate, and thereby maximizes performance of the capacitive touchscreen system according to the current number of touches being detected.

Set forth below is one embodiment of an illustrative pseudo code computer program corresponding to method 400 of FIG. 8. Note that all the pseudo code programs disclosed herein are preferably implemented in the navigation hardware controller module of touchscreen controller 100, although other means and methods of implementing such pseudo code are contemplated.

TABLE 3

Computer Pseudo Code Program for FIG. 8

```
While (1) {
    if (new frame) {
        if (num_of_touches_new – num_of_touches_old >
        threshold_for_increase) {
            sampling_rate ++;
            decimation_ratio ++;
        }
        else {
            if (num_of_touches_old – num_of_touches_new >
            threshold_for_decrease) {
                sampling_rate --;
                decimation_ratio --;
            }
        }
    }
}
```

Figure 9:
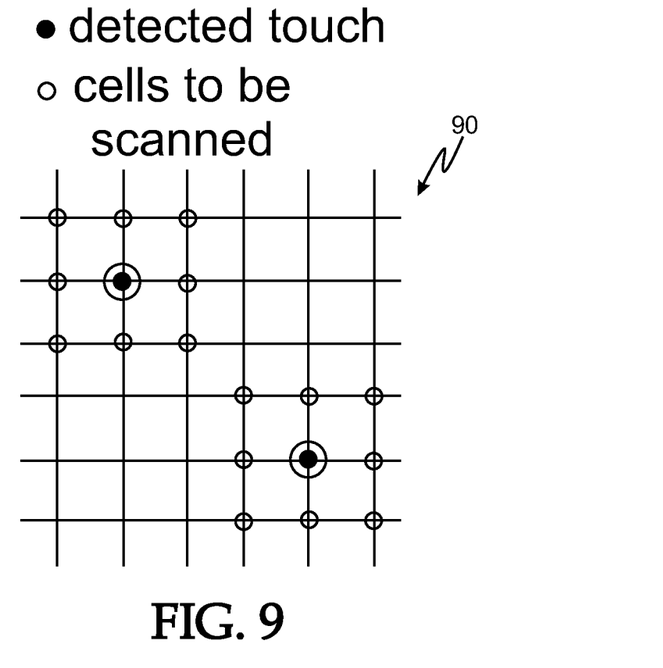
FIG. 9 shows one embodiment of a touchscreen that has been divided into quadrants for purposes of detecting touches thereon, and for reducing the power consumption of a capacitive touchscreen system.
Figure 10:
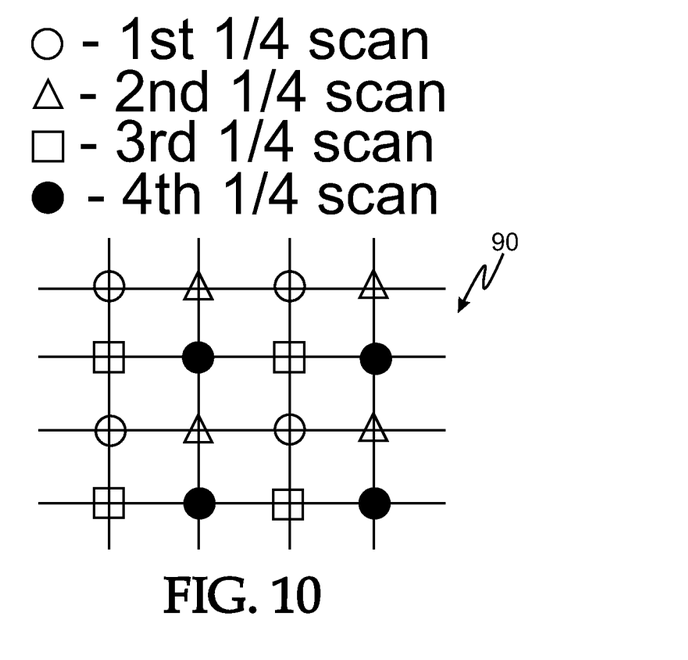
FIG. 10 shows another embodiment of a touchscreen that is scanned according to a predetermined pattern for purposes of detecting touches thereon, and for reducing the power consumption of a capacitive touchscreen system.

Referring now to FIGS. 9 and 10, we discuss some further specific means, methods and embodiments for reducing the portions of touchscreen that are to be scanned, with the objective of reducing the power consumption of the capacitive touchscreen system. One method to detect touches is perform a raster scan of the entire array of cells in touchscreen 90. The run time of such an algorithm is linear. However, if the presence of a touch or touches on touchscreen 90 can be inexpensively and quickly localized to a subset of the overall pixel or cell array before the detailed or fine detection of touches takes place, then the run time can be significantly reduced, and power consumption can be reduced. In one such embodiment, the overall pixel or cell array is divided into four quadrants. A sum of all cell or pixel values within each quadrant is calculated. If the sum of a given quadrant is above a predetermined threshold, then that quadrant is flagged as containing touches (see FIG. 9). In one embodiment, these summing and flagging operations are implemented in hardware so that they are fast and efficient. The flags corresponding to the four quadrants can then be read by firmware to determine in which quadrants fine touch detection is to be carried out. And, depending on the size of the touch grid, each quadrant can be further divided into smaller regions in which the summing and flagging are also implemented. In such a method, the run time of touch detection is logarithmic. Furthermore, firmware can be used to flag and quickly decide which drive lines should be deactivated and are unnecessary. For example, if the left half of touchscreen 90 is flagged as containing no touches, firmware can turn off the drive lines that are associated with the left half of touchscreen 90.

Other scanning modes, patterns and timing are also contemplated, such as that shown in FIG. 10, where only a portion of the pixels or cells of touchscreen 90 is illustrated, and where it will be seen that the pixels or cells on touchscreen 90 are scanned according to a predetermined staggered sequence and pattern of cells and pixels that may shift up, down or sideways or in diagonal fashion across touchscreen 90. Those skilled in the art will now appreciate that many different sequences and patterns for scanning in such fashion are possible.

Other special modes of operation in which only a fraction of touchscreen 90 is required to be activated can also be defined, such as for a keypad. Drive lines outside of the area of interest on touchscreen 90 are turned off, resulting in power savings. Alternatively, active drives inside the area of interest on touchscreen 90 can be driven at a higher sampling rate to enhance user experience. In another embodiment, a keyboard entry mode can be invoked via a register setting from touchscreen controller 100. When the keyboard entry mode is activated, touchscreen controller 100 focuses scanning activity on a sub-set of row and column locations that define a "QWERTY" type keyboard input matrix, while host controller 120 of FIG. 3 displays a picture of the keyboard layout on an LCD for the user to view. Touchscreen controller 100 then switches to a simplified less precise scanning mode where an interpolation/scanning algorithm tracks new "key-presses" and reports key-codes rather than precise finger locations. This provides benefit to the user by lowering power consumption and increasing touch panel typing accuracy. There is also a benefit provided to the system designer in that key presses are determined by touchscreen controller 100, thereby reducing the computational and power load of the system CPU by eliminating the need to precisely map finger touch locations when operating in keyboard entry mode.

The QWERTY type keyboard input matrix described above is only one example. Other examples of how an application subsystem can specify input modes at specified times and panel locations to the scanning subsystem include: (a) various other keyboard input configurations; (b) make key press detection or make and break key press detection; (c) button press area or force detection or binary-only press; (d) no press detection; (e) swipe detection in a specific axis and direction; (e) limiting detection to a smaller number of fingers, hands or touch devices than the maximum system capacity; detection of pinch or un-pinch gestures; (f) limiting spatial or temporal resolution or granularity; or (g) limiting detection to a specify sub-region on a panel. For each of these examples or any other application specified scanning mode or a combination of such limiting constraints and modes, the scanning subsystem will realize power saving by reducing both the electrical scanning requirements and the CPU load imposed by taking algorithmic advantage of any such constrained scanning mode.

Note that many different means and methods for implementing the methods and devices disclosed herein are contemplated, such as through the use of software or firmware loaded in a computer readable medium, or by implementing such means and methods in hardware such as in an Application Specific Integrated Circuit (ASIC). The various embodiments are not limited to applications in capacitive touchscreen system, and may be employed in other types of sensing devices and systems. Moreover, the various embodiments described herein are not limited to applications involving discrete finger touches, but are intended to include applications which employ gestures and multiple touches.

Note further that the various teachings presented herein may be applied to optically transmissive or non-optically-transmissive touchpads disposed, for example, on a printed circuit board, a flex board or other suitable substrate. While the primary use of capacitive touchscreen 90 is believed likely to be in the context of relatively small portable devices, and touchpads or touchscreens therefore, it may also be of value in the context of larger devices, including, for example, keyboards associated with desktop computers or other less portable devices such as exercise equipment, industrial control panels, household appliances, and the like. Similarly, while many embodiments of the invention are believed most likely to be configured for manipulation by a user's fingers, some embodiments may also be configured for manipulation by other mechanisms or body parts. For example, the invention might be located on or in the hand rest of a keyboard and engaged by the heel of the user's hand. Furthermore, various embodiments of capacitive touchscreen system 110 and capacitive touchscreen 90 are not limited in scope to drive electrodes disposed in rows and sense electrodes disposed in columns. Instead, rows and columns are interchangeable in respect of sense and drive electrodes. Various embodiments of capacitive touchscreen system 110 and capacitive touchscreen 90 are also capable of operating in conjunction with a stylus, such that stylus touches on touchscreen 90 are detected. System 110 and touchscreen 90 may further be configured to permit the detection of both of finger touches and stylus touches.

Note still further that included within the scope of the present invention are methods of making and having made the various components, devices and systems described herein.

The above-described embodiments should be considered as examples of the present invention, rather than as limiting the scope of the invention. In addition to the foregoing embodiments of the invention, review of the detailed description and accompanying drawings will show that there are other embodiments of the present invention. Accordingly, many combinations, permutations, variations and modifications of the foregoing embodiments of the present invention not set forth explicitly herein will nevertheless fall within the scope of the present invention.

The invention claimed is:

1. A method of reducing power consumption in a capacitive touchscreen system, comprising:
    providing, under control of a touchscreen processor, drive signals to a first plurality of electrically conductive drive traces, a second plurality of electrically conductive sense traces being located in proximity to the first plurality of drive traces such that mutual capacitances are developed between the first and second pluralities of traces by the drive signals at locations where the first and second pluralities of traces intersect to form pixels, such mutual capacitances changing in the presence of one or more fingers, hands or touch devices brought into proximity thereto at touch locations on the touchscreen;
    sensing at a first scan rate in a full scan mode over a first predetermined period of time corresponding to a no touch timer, and under control of the touchscreen processor, mutual capacitances along the second plurality of sense traces;
    when touches are detected on the touchscreen within the first predetermined period of time, resetting the no touch timer to zero and continuing to sense at the first scan rate in the full scan mode mutual capacitances along the second plurality of sense traces;
    when no touches are detected on the touchscreen within the first predetermined period of time, sensing at a second scan rate in a first rest mode over a second predetermined period of time corresponding to a first rest timer, comprising:
        scanning less than all the second plurality of traces;
    when touches are detected on the touchscreen within the second predetermined period of time, resetting the no touch timer to zero and resuming sensing at the first scan rate in the full scan mode the mutual capacitances along the second plurality of sense traces;
    when no touches are detected on the touchscreen within the second predetermined period of time, sensing at a third scan rate in a second rest mode over a third predetermined period of time corresponding to a second rest timer, the third scan rate being lower than the second scan rate;
    when touches are detected on the touchscreen within the third predetermined period of time, resetting the no touch timer to zero and resuming sensing at the first scan rate in the full scan mode the mutual capacitances along the second plurality of sense traces;
    when no touches are detected on the touchscreen within the third predetermined period of time, entering a locked mode in which a reduced number of the second plurality of traces are sensed.

2. The method of claim 1, wherein sensing at the third reduced scan rate further comprises scanning less than all the second plurality of traces.

3. The method of claim 1, further comprising detecting an unlocking gesture on the touchscreen.

4. The method of claim 1, further comprising resuming sensing at the first full scan rate in the full scan mode the mutual capacitances along the second plurality of sense traces.

5. The method of claim 1, further comprising sequentially acquiring frames corresponding to different portions of the touchscreen.

* * * * *